United States Patent [19]

Borman

[11] Patent Number: 5,399,661

[45] Date of Patent: Mar. 21, 1995

[54] POLY(ALKYLENE CYCLOHEXANEDICARBOXYLATE)-(ALKYLENE TEREPHTHALATE) COPOLYESTERS

[75] Inventor: Willem F. H. Borman, Evansville, Ind.

[73] Assignee: General Electric Company, Pittsfield, Mass.

[21] Appl. No.: 551,396

[22] Filed: Jul. 12, 1990

[51] Int. Cl.$^6$ ............................................. C08G 63/20
[52] U.S. Cl. ................................. 528/307; 528/272; 528/304; 528/308.6
[58] Field of Search ............. 528/272, 304, 307, 308.6

[56] References Cited

U.S. PATENT DOCUMENTS

| | | | |
|---|---|---|---|
| 2,465,319 | 3/1949 | Whinfield et al. | 526/71 |
| 2,675,390 | 4/1954 | Rosenblatt | 548/579 |
| 2,888,484 | 5/1959 | Dehm et al. | 562/509 |
| 2,891,930 | 6/1959 | Caldwell et al. | 528/307 |
| 2,901,466 | 8/1959 | Kibler et al. | 528/288 |
| 3,047,539 | 7/1962 | Pengilly | 528/285 |
| 3,444,327 | 5/1969 | Jaffe | 340/825.5 |
| 3,515,628 | 6/1970 | Jackson, Jr. et al. | 428/415 |
| 3,657,389 | 4/1972 | Caldwell et al. | |
| 4,011,286 | 3/1977 | Seymour et al. | |
| 4,066,600 | 1/1978 | Pletcher et al. | 524/141 |
| 4,066,607 | 1/1978 | Breitenfellner et al. | 524/602 |
| 4,071,578 | 1/1978 | Lasher | 525/158 |
| 4,125,571 | 11/1978 | Scott et al. | 528/302 |
| 4,125,572 | 11/1978 | Scott | 528/307 |
| 4,225,688 | 9/1980 | Dennehey et al. | 525/444 |
| 4,327,206 | 4/1982 | Jackson, Jr. et al. | 528/179 |
| 4,330,670 | 5/1982 | Sublett | 528/302 |
| 4,352,924 | 10/1982 | Wooten et al. | 528/302 |
| 4,524,165 | 6/1985 | Musser et al. | 524/99 |
| 4,555,540 | 11/1985 | Avakian | 524/130 |
| 4,754,064 | 6/1988 | Lillwitz | 562/509 |
| 4,778,656 | 10/1988 | Allen et al. | 422/20 |
| 5,017,679 | 5/1991 | Chang et al. | 528/272 |

OTHER PUBLICATIONS

W. J. Jackson, Jr. et al., "Polyester Hot-Melt Adhesives. I. Factors Affecting Adhesion to Epoxy Resin Coatings", Journal of Applied Polymer Science, vol. 14, pp. 685–698 (1970).

Freifelder et al., Journal of Organic Chemistry, 31, 34–38 (1966).

Wilfong et al, J. Polymer Sci., vol. 54, 385–410 (1961).

Carpenter et al., Journal of Soc. Dyers and Colorists, vol. 65, 469 (1941).

Primary Examiner—John Kight, III
Assistant Examiner—S. A. Acquah

[57] ABSTRACT

Copolyester compositions are provided which comprise the reaction product of at least one straight chain, branched, or cycloaliphatic $C_2$–$C_{10}$ alkane diol or a chemical equivalent thereof, a mixture of at least two cycloaliphatic diacids or chemical equivalents thereof, the mixture comprising predominantly a trans-enantiomer, and at least one aromatic diacid or a chemical equivalent thereof. These copolyesters have superior ductility to the homopolymers of the diol component and either of the diacid components.

9 Claims, No Drawings

POLY(ALKYLENE CYCLOHEXANEDICARBOXYLATE)-(ALKYLENE TEREPHTHALATE) COPOLYESTERS

FIELD OF THE INVENTION

This invention relates to copolyester compositions comprised of the reaction product of at least one straight chain, branched, or cycloaliphatic $C_2$-$C_{10}$ alkane diol or a chemical equivalent thereof, a mixture of at least two cycloaliphatic diacids or chemical equivalents thereof with the mixture predominantly comprising a trans-enantiomer, and at least one aromatic diacid or chemical equivalent thereof. Filled and flame-retardant compositions are contemplated as well.

These copolyester compositions are highly crystalline and crystallize rapidly. The ductility of these copolyesters, as measured by Notched Izod impact strength, is significantly improved over that of the homopolymers of the diol and either of the cycloaliphatic diacid or chemical equivalent thereof or aromatic diacid or chemical equivalent thereof. Surprisingly, the compositions exhibit enhanced mold flow in comparison with state of the art materials.

BACKGROUND OF THE INVENTION

Novel copolyester compositions comprising the reaction product of at least one straight chain, branched, or cycloaliphatic $C_2$-$C_{10}$ alkane diol or a chemical equivalent thereof, a mixture of at least two cycloaliphatic diacids or chemical equivalents thereof with the mixture predominantly comprising a trans-enantiomer, and at least one aromatic diacid or chemical equivalent thereof have been discovered which are highly crystalline, crystallize rapidly, and have improved ductility, impact strength, and enhanced melt flow in comparison with state of the art materials.

Crystallizable polyesters of cycloaliphatic diacids or derivatives thereof with aliphatic and/or cycloaliphatic diols have relatively high melting points and are quite UV resistant as they do not appreciably absorb near-UV light. Many of these polyesters including copolyesters incorporating (a)(i) a 50:50 mixture of cis- and trans-1,4-cyclohexane dicarboxylic acid or (a)(ii) trans-cyclohexane dicarboxylic acid and (b) terephthalic acid were explored for use as hot melt adhesives. However, the ratio of (a)(i):(b) was always less than or equal to 3:2 and the ratio of (a)(ii):(b) was always greater than or equal to 1:1. See, Jackson et al., J. Applied Polymer Science, Vol. 14, 685-98, (1970); U.S. Pat. No. 3,515,628.

Wilfong, J. Polymer Sci., Vol. 54, 385-410 (1961), referred to polyesters of hexahydro terephthalic acid, the cis-/trans-mixture of cyclohexanedicarboxylic acids obtained by the hydrogenation of terephthalic acid. See, Caldwell et al, U.S. Pat. No. 2,891,930 including poly(-neopentyl cyclohexane dicarboxylate); Carpenter, Journal of Soc. Dyers and Colorists, Vol. 65,469 (1941).

Kibler et al, U.S. Pat. No. 2,901,466, disclose linear polyesters and polyester-amides prepared by condensing cis- and/or trans-1,4-cyclohexanedimethanol with one or more bifunctional reactants which, because of high melting temperatures, are advantageous for the preparation of fibers for use in fabrics and films for use as support for photographic emulsions.

Friction activatable solvent-free adhesives comprising a thermoplastic linear polyester derived from one or more saturated aliphatic dicarboxylic acids and/or aromatic dicarboxylic acids and one or more saturated aliphatic diols, a tackifier, and a plasticizer are disclosed by Wayne et al, U.S. Pat. No. 4,066,600.

Low distortion fiberous, filler reinforced molding materials containing a copolyester, which has a crystallization temperature of 35° C. to 70° C., based on poly(1,4-butylene terephthalate), and an amount which produces this crystallization temperature range of at least one co-component which is selected from orthophthalic acid; isophthalic acid; 4,4'-diphenylsulphonedicarboxylic acid; 2,2-bis-(4-(hydroxy-ethoxyphenyl))-propane; 1,3-bis-hydroxyethyl-5,5-dialkylhydantoin; 1,3,3,-trimethyl-5-carboxy-3-(p-carboxyphenyl)indane; and 1,4-cyclohexanedimethanol are disclosed by Breitenfellner et al, U.S. Pat. No. 4,066,607.

Esters comprising the reaction product of a diol, a triol, a cyclic carboxylic acid, an unsaturated aliphatic dicarboxylic acid, and a saturated, aliphatic dicarboxylic acid cross-linked with an aminoplast resin were combined to form a one step chemical coating by Lasken, U.S. Pat. No. 4,071,578.

Scott et al, U.S. Pat. No. 4,125,571, disclose a combination of a poly(1,4-butylene terephthalate) resin or a copolyester thereof and a polyester resin derived from a cyclohexanedimethanol and a hexacarbocyclic dicarboxylic acid, while Scott, U.S. Pat. No. 4,125,572, describes thermoplastic molding compositions and articles molded therefrom that retain optical clarity comprising a polycarbonate, a poly(1,4-butylene terephthalate), and a copolyester of an aliphatic or cycloaliphatic diol and a mixture of terephthalic and isophthalic acids.

Copolyesters of poly(ethylene cyclohexane dimethylene terephthalate) and a flexible copolymer containing alternating covalently bonded blocks of poly(butylene terephthalate) and poly(1,4-butylene ether) are disclosed by Dennehey et al, U.S. Pat. No. 4,225,688, as exhibiting good bonding characteristics to polyvinyl chloride as well as good impact resistance and improved resistance to crazing or cracking in the presence of solvents such as alcohol.

Jackson et al, U.S. Pat. No. 4,327,206, disclose a process for the preparation of poly(1,4-cyclohexane dicarboxylate) polyesters with high trans-isomer content comprising heating, in the presence of a suitable catalyst, an ester of trans-1,4-cyclohexanedicarboxylic acid and a diacyl derivative of an aromatic diol.

Avakian, U.S. Pat. No. 4,555,540, discloses flame retardant blends of aromatic polycarbonates and polyesters incorporating certain phosphorous containing materials for stability.

An improved method for the sterilization of transparent plastic articles by ionizing radiation comprising the use of an article made from a polymer composition comprising poly(bisphenol-A) carbonate and a copolyester of ethylene glycol, cyclohexane dimethanol and an aromatic acid are disclosed by Allen et al in U.S. Pat. No. 4,778,656.

None of these prior compositions have been determined to possess improved ductility over the homopolymers which formed from the same reactants.

SUMMARY OF THE INVENTION

According to the present invention, there are provided copolyester compositions comprising the reaction product of (A) at least one straight chain, branched, or cycloaliphatic $C_2$-$C_{10}$ alkane diol or chemical equivalent thereof; (B) a mixture of at least two cycloaliphatic diacids or chemical equivalents thereof, the mixture comprising predominantly a trans-enantiomer; and (C) at least one aromatic diacid or chemical equivalent thereof.

When the expression mixture comprising predominantly a trans-enantiomer is used herein and in the appended claims, it is meant to contemplate from about 51 to about 99.5 parts by weight of trans-enantiomer and from about 0.5 to about 49 parts by weight of cis-enantiomer based upon 100 parts by weight of cis- and trans-enantiomers combined.

In preferred embodiments, the copolyester compositions comprise the reaction product of (A) 1,4-butane diol, (B) a mixture of from about 51 to about 99.5 parts by weight of dimethyl-trans-1,4-cyclohexanedicarboxylate and from about 0.5 to about 49 parts by weight of dimethyl-cis-1,4-cyclohexanedicarboxylate based upon 100 parts by weight of the cis- and trans-enantiomers combined and (C) dimethyl terephthalate.

DETAILED DESCRIPTION OF THE INVENTION

The diols (A) useful in the preparation of the copolyester compositions of the present invention are straight chain, branched or cycloaliphatic but preferably straight chain or branched alkane diols and may contain from 2 to 10 carbon atoms. Examples of such glycols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl, 1,5-pentane diol; 1,6-hexane diol; 1,4-cyclohexane dimethanol and particularly its cis- and trans-enantiomers; triethylene glycol; 1,10-decane diol; and mixtures of any of the foregoing. Particularly preferred is 1,4-butane diol. If a cycloaliphatic diol or chemical equivalent thereof and particularly 1,4-cyclohexane-dimethanol or its chemical equivalents are to be used as the diol component, it is preferred that a ratio of cis- to trans-enantiomer thereof ranging from 1 to 4 to 4 to 1, and preferably a ratio of 1 to 3 is used.

Chemical equivalents to the diols include esters or ethers such as dialkyl esters, diaryl esters, polytetramethylene oxide, and the like.

The cycloaliphatic diacids (B) useful herein include carboxylic acids having two carboxyl groups each of which is attached to a saturated carbon in a saturated ring. A preferred mixture of cycloaliphatic diacids is a mixture of predominantly the trans-enantiomer of 1,4-cyclohexane dicarboxylic acid and the remainder, the cis-enantiomer of 1,4-cyclohexane dicarboxylic acid.

Cyclohexanedicarboxylic acids and their chemical equivalents can be prepared, for example, by the hydrogenation of cycloaromatic diacids and corresponding derivatives such as isophthalic acid or terephthalic acid in a suitable solvent, water or acetic acid at room temperature and at atmospheric pressure using suitable catalysts such as rhodium supported on a suitable carrier of carbon or alumina. See, Freifelder et al, *Journal of Organic Chemistry*, 31, 3438 (1966); U.S. Pat. Nos. 2,675,390 and 4,754,064. They may also be prepared by the use of an inert liquid medium in which a phthalic acid is at least partially soluble under reaction conditions and a catalyst of palladium or ruthenium in carbon or silica. See, U.S. Pat. Nos. 2,888,484 and 3,444,237.

Typically in the hydrogenation, two enantiomers are obtained in which the carboxylic acid groups are in cis- or trans-positions. The cis- and trans-enantiomers can be separated by crystallization with or without a solvent, for example, n-heptane, or by distillation. The cis-enantiomer tends to blend better; however, the trans-enantiomer has higher melting and crystallization temperatures and is preferred in a major proportion in a mixture of the enantiomers. Mixtures of the cis- and trans-enantiomers useful herein comprise predominantly the trans-enantiomer with the remainder comprising the cis-enantiomer, i.e. from about 51 to about 99.5 parts by weight of the trans-enantiomer and from about 0.5 to about 49 parts by weight of the cis-enantiomer based upon 100 parts by weight of the cis- and the trans-enantiomers combined. Most preferably, the trans-enantiomer will comprise at least about 75 parts by weight and the cis-enantiomer will comprise the remainder based upon 100 parts by weight of cis- and trans-enantiomer combined.

Chemical equivalents of the cycloaliphatic diacids include esters, alkyl esters, e.g. dialkyl esters, diaryl esters, anhydrides, acid chlorides, acid bromides, and the like. The preferred chemical equivalents comprise the dialkyl esters of the cycloaliphatic diacids, and the most preferred chemical equivalent comprises the dimethyl ester of the cycloaliphatic diacid, particularly dimethyl-1,4-cyclohexanedicarboxylate.

Dimethyl-1,4-cyclohexanedicarboxylate can be obtained by ring hydrogenation of dimethylterephthalate, and two enantiomers having the carboxylic acid groups in the cis- or trans- positions are obtained. The enantiomers can be separated as above, and the trans-enantiomer is especially preferred in a major proportion for the reasons above. Mixtures of the enantiomers are suitable as explained above and preferably in amounts as explained above.

Examples of aromatic diacids (C) include isophthalic or terephthalic acid, 1,2-di(p-carboxyphenyl) ethane, 4,4'-dicarboxydiphenyl ether, etc. and mixtures of these. The preferred aromatic dicarboxylic acid is terephthalic acid.

Chemical equivalents of the aromatic diacids also include esters, alkyl esters, e.g. dialkyl esters, diaryl esters, anhydrides, acid chlorides, acid bromides and the like. The preferred chemical equivalents comprise the dialkyl esters of the aromatic diacids, and the most preferred chemical equivalents comprise the dimethyl esters of the aromatic acids, particularly dimethyl terephthalate.

The copolyester compositions of the present invention are typically obtained through the condensation or transesterification of the diol or diol equivalent component (A) with the mixture of at least two cycloaliphatic diacids or chemical equivalents component (B) and the aromatic diacid or chemical equivalent component (C) and have recurring units of the formula

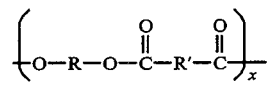

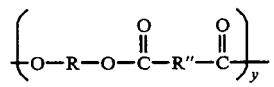

wherein R represents an alkyl or cycloalkyl radical containing 2 to 10 carbon atoms and which is the residue of a straight chain, branched, or cycloaliphatic alkane diol having 2 to 10 carbon atoms or of a chemical equivalent thereof;

R' is a mixture of at least two cycloaliphatic radicals which are the decarboxylated residue derived from a cycloaliphatic diacid or chemical equivalent thereof, the mixture comprising predominantly a trans-enantiomer;

R" is an aromatic radical which is the decarboxylated residue derived from an aromatic diacid or chemical equivalent thereof; and the x units comprise from about 10 to about 90 parts by weight and the y units comprise from about 90 to about 10 parts by weight of 100 parts by weight of the copolyester.

They particularly have recurring units of the formula

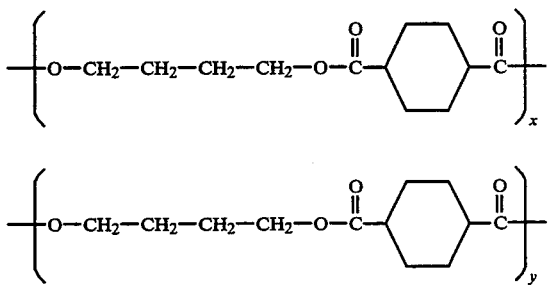

wherein R from above is derived from 1,4-butane diol;

R' from above is a trans- or cis-cyclohexane ring derived from trans- or cis-cyclohexanedicarboxylate or a chemical equivalent thereof and is a mixture of predominantly the trans-enantiomer thereof;

R" is an aromatic unsaturated ring derived from terephthalic acid or a chemical equivalent thereof; and the x units and the y units are as defined above.

All such polyesters can be made following the teachings of, for example, U.S. Pat. Nos. 2,465,319, 2,901,466, 3,047,539, and 3,515,628.

The reaction is generally run with an excess of the diol component and in the presence of a suitable catalyst such as a tetrakis(2-ethyl hexyl)titanate, in a suitable amount, typically about 20 to 200 ppm of titanium based upon the final product.

The molar ratio of cycloaliphatic diacid or chemical equivalent to aromatic diacid or chemical equivalent should be such that impact strength of the copolyester is increased over that of the separate homopolymers. The ratio generally ranges from about 1 to 9 to about 9 to 1 and preferably from about 1 to 5 to about 5 to 1. In a preferred embodiment, the molar ratio ranges from less than about 1 to 1 to about 1 to 9, particularly when the cycloaliphatic diacid or chemical equivalent components comprises a mixture of cis- and trans-1,4-cyclohexane dicarboxylic acid or cis- and trans-dimethyl-1,4-cyclohexanedicarboxylic acid with only a small but measurable amount of cis-enantiomer, a mixture of the cis- and trans-enantiomers thereof wherein the ratio of cis:trans is 1:3 or less, or when only the trans-enantiomer thereof is used. In another preferred embodiment, when the cycloaliphatic diacid or chemical equivalent component comprises only a small but measurable amount of 1,4-cis-cyclohexane dicarboxylate acid or dimethyl cis-1,4-cyclohexanedicarboxylic acid and the remainder the corresponding trans-enantiomer, the molar ratio of cycloaliphatic to aromatic diacid or chemical equivalent is less than 1 to 1 and when the cycloaliphatic diacid or chemical equivalent component comprises a mixture of at least about 75 parts by weight of the trans- and the remainder the cis-enantiomer of 1,4-trans-cyclohexane dicarboxylic acid or dimethyl-trans-1,4-cyclohexane dicarboxylate based upon 100 parts by weight of the cis- and trans-enantiomers combined, the molar ratio of cycloaliphatic to aromatic diacid or chemical equivalent thereof ranges from greater than 3 to 2 to 9 to 1.

The copolyester compositions of the present invention are highly crystalline and crystallize rapidly. They have single melting points intermediate between those of homopolymers of the diol and either of the cycloaliphatic or aromatic diacid components, indicating true co-crystallization of the two different ester segments. In contrast, melt blends of the homopolymers demonstrate distinct melting peaks and two distinct crystallization peaks.

Special mention is made of blends comprising the compositions of the present invention. Additionally, the compositions of the present invention may be molded, extruded, or thermoformed into articles by conventional methods known to one of ordinary skill in the art.

Conventional processes for mixing thermoplastic polymers can be used for the manufacture of compositions within the present invention. For example, the compositions can be manufactured using any suitable mixing equipment, cokneaders, or extruders under conditions known to one of ordinary skill in the art.

Additionally, conventional additives such as other thermoplastic resins, reinforcing fibers or fillers, impact modifiers, flame retardants, pigments, or combinations of any of the foregoing may be added to compositions of the present invention.

Illustrative of the thermoplastic resins are a vinyl resin, a polyester resin, a polyamide resin, a polycarbonate resin, a polyacetal resin, a polyether resin, a poly(etherester) resin, a poly(etherimide) resin, a poly(etherimide ester) resin, a poly(sulfone) resin, a poly(ethersulfone) resin, interpolymers comprising units of any of the foregoing resins, compositions comprising blends of any of them or a combination of any of the foregoing.

Examples of suitable vinyl resins include styrene polymers and copolymers as well as substituted styrene polymers and copolymers, e.g., those from vinyl toluene and alpha-methylstyrene and any copolymerizable vinyl monomer, such as acrylonitrile, methyl methacrylate, maleimide, or maleic anhydride, as well as grafts of styrene and related compounds and backbone polymers such as butadiene, i.e., the styrene polymers known as high impact polystyrene, also known as, HIPS.

Examples of suitable polyesters are linear saturated polyesters which can be obtained either by polycondensation of a hydroxycarboxylic acid, or preferably, by synthesis from a dicarboxylic acid and a saturated diol. These include but are not limited to poly(butylene trans-1,4-cyclohexane dicarboxylate), poly(1,4-butylene terephthalate) and the like.

Examples of suitable nylons are linear polycondensates of lactams of 6 to 12 carbon atoms and conventional polycondensates of diamines and dicarboxylic acids, e.g. nylon 6,6; nylon 6,8; nylon 6,9; nylon 6,10; nylon 6,12; nylon 8,8; and nylon 12,12. Further examples to be mentioned are nylon 6, nylon 11 and nylon 12, which are manufactured from the corresponding lactams. In addition, it is possible to use polycondensates of aromatic dicarboxylic acids, e.g., isophthalic aicd or terephthalic acid, with diamines, e.g., hexamethylenediamine or octamethylenediamine, polycondensates of aliphatic starting materials, e.g., m- and p-xylylenediamines, with adipic acid, suberic acid and sebacic acid, and polycondensates based on alicyclic starting materials, e.g., cyclohexanedicarboxylic acid, cyclohexanediacetic acid, 4,4'-diaminodicyclohexylmethane and 4,4'-diaminodicyclohexylpropane. The nylons preferably have a relative viscosity of from 2.30 to 3.60 measured at 1 percent strength in concentrated sulfuric acid at 24° C.

A polycarbonate is poly-2,2-propane-bis(4-phenyl)-carbonate, which is manufactured in accordance with conventional processes by reacting phosgene or diphenylcarbonate with 2,2-bis(4'-hydroxyphenyl)-propane. Other preferred polycarbonates contain tetrabromobisphenol-A as an additional comonomer, which improves the fire resistance of the molding compositions.

Examples of polyacetals which may be employed are, in particular, the oxymethylene polymers, polyoxymethylene being of particular importance. However, oxymethylene copolymers which, in addition to oxymethylene groups, contain up to 30 percent by weight, preferably from 0.1 to 25 percent by weight, of other oxyalkylene groups, for example the oxyethylene group, the trimethylene oxide group, or preferably, the tetramethylene oxide group, are also suitable, as are terpolymers. The use of oxymethylene homopolymers in which the end groups of the molecules have been stabilized against degradation by esterifying, etherifying or some other conventional chain termination is preferred. The oxymethylene polymers usually have a melting point of about 130° C.

Polyethers which can be used include polyarylene ethers amongst which polyphenylene ethers deserve particular mention. The use of poly(2,6-dimethyl-1,4-phenylene oxide) is preferred, and in order to lower its melt viscosity and improve its processability, it may be advantageous to admix it with from about 10 to 90 percent by weight of polystyrene (based on the mixture of polyphenylene ether and polystyrene). If polyphenylene ethers are to be blended, e.g., with polyamides, polycarbonates, polyesters, mixtures thereof, and the like, a small amount of functionalizing agent, e.g., maleic anhydride, fumaric acid, etc., can be reacted with the polyphenylene ether in known ways to improve compatibility.

Impact modifiers useful herein include but are not limited to multi-stage core-shell polymers having a rubbery core derived from an acrylate or a (meth)acrylate, a diene, or a mixture of the foregoing, and a vinyl-based polymer or copolymer outer shell, some of which are available commercially under the tradenames ACRYLOID® KM 330, also known as PARALOID® EXL 3330, or ACRYLOID® KM 653, also known as PARALOID® EXL 3691, from Rohm & Haas Company.

Suitable impact modifiers also include but are not limited to ABS modifiers which are typically represented by graft copolymers of vinyl cyanide-conjugated diolefin-alkenyl aromatic. They particularly comprise acrylonitrile-butadiene-styrene graft copolymers, but also encompass mixtures of analogous materials.

Preferably, the ratio of styrene to acrylonitrile in the terpolymer ranges from about 3.5 to 1 to about 2.5 to 1 and the ratio of butadiene to styrene/acrylonitrile is 7 to 3. Most preferably, the ratio of sytrene to acrylonitrile is either 3.5 to 1, 3 to 1 or 2.5 to 1.

DESCRIPTION OF THE PREFERRED EMBODIMENTS

The following examples illustrate the invention without limitation. All parts are given by weight unless otherwise indicated impact strengths are represented as notched and unnotched Izods according to ASTM-D-256 or Dynatup impact at room temperature (RT) (23° C.) unless otherwise specified. Strength properties are measured by ASTM-D-638 as flexural modulus, flexural strength, tensile break strength and tensile elongation. Melt viscosities are determined at 250° C. unless otherwise indicated. All poly(1,4-butylene-1,4-trans-cyclohexane dicarboxylate), all 1,4-trans-cyclohexanedicarboxylate and chemical equivalents thereof, and compositions containing the same used in the examples below had a measurable, but very small cis-enantiomer content.

COMPARATIVE EXAMPLE 1A*

Poly(1,4-butylene-1,4-trans-cyclohexane dicarboxylate) (PBCD) was produced by the transesterification of 133.0 parts of trans-1,4-dimethylcyclohexane dicarboxylate (t-DMCD), 101.0 parts of 1,4-butane diol (BD) and about 160 ppm of titanium in the form of tetrakis(2-ethyl hexyl) titanate.

Tensile and Izod bars were molded on a 3.5 oz. Van Dorn injection molding machine with barrel zone temperatures at 250° C., nozzle temperature at 260° C. and mold temperature at 75° C.

Properties are summarized in Table 1.

EXAMPLE 1

A copolyester was produced by transesterification of 14.0 parts of trans-1,4-dimethylcyclohexane dicarboxylate (t-DMCD) and 7.0 parts of dimethyl terephthalate (DMT) in a molar ratio of 2:1, an excess of 1,4-butane diol (BD), and about 160 ppm of titanium in the form of tetrakis(2-ethyl hexyl) titanate.

Tensile and Izod bars were molded on a 3.5 oz. Van Dorn injection molding machine with barrel zone temperatures at 250° C., nozzle temperature at 260° C. and mold temperature at 75° C.

Spiral flow was measured on a 3.5 oz. Van Dorn injection molding machine at a pressure of 600 psi, a cycle time of 30 seconds, barrel zone temperatures of 250° C., nozzle temperature of 260° C., and mold temperature of 75° C. in two molds, one having three channels having cross-sections of 0.048"×0.313", 0.032"×0.313", and 0.016"×0.313" radiating from the center and one having a single mold channel 0.096"×0.313".

DSC measurements were made with a heating rate of 20° C./min. to determine peak melt temperature, Tm, and enthalpy of fusion, Hm; and with a cooling rate of 60° C./min. to determine peak crystallization temperature, Tc, and enthalpy of crystallization, Hc.

Properties are summarized in Table 1.

EXAMPLE 2

The procedure of Example 1 was followed substituting a molar ratio of t-DMCD:DMT of 1:1.

Properties are summarized in Table 1.

EXAMPLE 3

The procedure of Example 1 was followed substituting a molar ratio of t-DMCD:DMT of 1:2.

Properties are summarized in Table 1.

EXAMPLE 4

The procedure of Example 1 was followed substituting a molar ratio of t-DMCD:DMT of 1:2 to produce a copolyester (melt viscosity 5000 poise) which was molded and tested as in Example 1.

Properties are summarized in Table 1.

EXAMPLE 5

The procedure Of Example 1 was followed substituting a molar ratio of t-DMCD:DMT of 1:2 to produce a copolyester (melt viscosity 3000 poise) which was molded and tested as in Example 1.

Properties are summarized in Table 1.

EXAMPLE 6

The procedure of Example 1 was followed substituting a molar ratio of t-DMCD:DMT of 1:2 to produce a copolyester (melt viscosity 1900 poise) which was molded and tested as in Example 1.

Properties are summarized in Table 1.

EXAMPLE 7

The copolyester of Example 6 was blended with 0.1 part of a mold release package. The resultant composition was extruded on a 2.5" single screw extruder operating at 100 rpm with barrel zone temperatures at 250° C. The extruded composition was molded and tested following the procedure of Example 1.

Properties are summarized in Table 1.

EXAMPLE 8

The procedure of Example 1 was followed substituting a molar ratio of t-DMCD:DMT of 1:3 to produce a copolyester (melt viscosity 4800 poise) which was molded and tested as in Example 1.

Properties are summarized in Table 1.

EXAMPLE 9

The procedure of Example 1 was followed substituting a molar ratio of t-DMCD:DMT of 1:3 to produce a copolyester (melt viscosity 2000 poise) which was molded and tested as in Example 1.

Properties are summarized in Table 1.

EXAMPLE 10

The copolyester of Example 9 was blended with 0.1 part of a mold release package. The resultant blend was extruded, molded and tested following the procedure of Example 1.

Properties are summarized in Table 1.

EXAMPLE 11

The procedure of Example 1 was followed substituting a molar ratio of t-DMCD:DMT of 1:3 to produce a copolyester (melt viscosity 5600 poise) which was molded and tested as in Example 1.

COMPARATIVE EXAMPLE 11A*

Poly(1,4-butylene terephthalate) (PBT) was produced by the transesterification of dimethyl terephthalate (DMT), an excess of 1,4-butane diol (BD), and 160 ppm of titanium in the form of tetrakis(2-ethyl hexyl) titanate.

The polyester was molded and tested following the procedure of Example 1.

Properties are summarized in Table 1.

COMPARATIVE EXAMPLE 11B*

100.0 parts by weight of poly(1,4-butylene terephthalate) produced by the transesterification of dimethyl terephthalate and 1,4-butane diol (PBT-Valox ® 307 - General Electric Company) were molded and tested following the procedure of Example 1.

Properties are summarized in Table 1.

COMPARATIVE EXAMPLE 11C*

99.75 parts of poly(1,4-butylene terephthalate) produced by the transesterification of dimethyl terephthalate and 1,4-butane diol (PBT-Valox ® 325M - General Electric Company) and 0.25 part of a mold release/stabilizer package were extruded, molded and tested following the procedure of Example 1.

Properties are summarized in Table 1.

COMPARATIVE EXAMPLE 11D*

99.65 parts of poly(1,4-butylene terephthalate) produced by the transesterification of dimethyl terephthalate and 1,4-butane diol (PBT-Valox ® 325 - General Electric Company) and 0.35 part of a mold release/stabilizer package were extruded, molded and tested following the procedure of Example 1.

Properties are summarized in Table 1.

Examples 1 and 3–10 when compared with Comparative Example 1A* and 11A–D* illustrate that the ductility of copolyesters of the present invention, as measured by Notched Izod impact strength, is significantly superior to that of the homopolymers.

Examples 1 and 4–10 when compared with Comparative Examples 11A–D* illustrate the improved melt flow of the copolyesters of the present invention.

TABLE 1

PBCD-PBT COPOLYESTERS[A]

| Example | 1A* | 1 | 2 | 3 | 4 | 5 | 6 | 7 | 8 |
|---|---|---|---|---|---|---|---|---|---|
| t-DMCD[B]:DMT[C] (molar ratio) | 1:0 | 2:1 | 1:1 | 1:2 | 1:2 | 1:2 | 1:2 | 1:2 | 1:3 |
| Mold Release/Stabilizer (%) | — | — | — | — | — | — | — | 0.1 | — |
| Melt viscosity @ 250° C. (poise) | 5000 | 4600 | 6000 | 4700 | 5000 | 3000 | 1900 | 1900 | 4800 |
| DSC Data | | | | | | | | | |
| Tm (°C.) | 163 | 164.4 | 174.5 | 189.7 | 190 | 191 | 194 | — | 199 |
| Hm (J/g) | 22.0 | 28.2 | 23.6 | 29.6 | 36 | 40 | 33 | — | 41 |
| Tc @ −60°/min (°C.) | 112.0 | 112.2 | 118.3 | 113.3 | 131 | 125 | 116 | — | 131 |
| Hc (J/g) | 29.1 | 27.0 | 30.1 | 28.7 | 36 | 30 | 37 | — | 35 |
| Tg (°C.) | 31 | 20 | — | 27 | — | — | — | — | — |
| Cp (J/g.K) | 0.08 | 0.06 | — | 0.12 | — | — | — | — | — |
| Tensile Strength | 3520 | 3070 | — | 4220 | 5100 | 5100 | 5200 | — | 5600 |

TABLE 1-continued

PBCD-PBT COPOLYESTERS[A]

| | | | | | | | | | |
|---|---|---|---|---|---|---|---|---|---|
| (psi) | | | | | | | | | |
| Tensile Elongation (%) | 435 | 478 | — | 489 | 410 | 610 | 610 | — | 610 |
| Flexural Modulus (Kpsi) | 93.4 | 102.3 | — | 204.6 | 198 | 191 | 185 | — | 233 |
| Flexural Strength (psi) | 4460 | 4920 | — | 7930 | 8900 | 8900 | 8900 | — | 9900 |
| Notched Izod @ RT (ft-lbs/in) | 1.6 | 2.3 | — | 2.2 | 2.5 | 2.4 | 1.7 | 1.2 | 1.7 |
| Unnotched Izod @ RT (ft-lbs/in) | NB | NB | — | NB | NB | NB | NB | NB | NB |
| Falling Dart Impact @ Max. load | | | | | | | | | |
| (ft-lbs) | — | — | — | — | 21 | 21 | 21 | 15 | 24 |
| total (ft-lbs) | — | — | — | — | 38 | 35 | 34 | 32 | 39 |
| Spiral Flow (m) Channel Cross Section | | | | | | | | | |
| .094" × .313" | — | — | — | — | 260 | 310 | 370 | — | 250 |
| .048" × .313" | — | 81 | — | — | 67 | 85 | 98 | 97 | 68 |
| .032" × .313" | — | 30 | — | — | 26 | 35 | 39 | 43 | 27 |
| .016" × .313" | — | 4 | — | — | 5 | 5 | 5 | 4 | 5 |

| Example | 9 | 10 | 11 | 11A* | 11B* | 11C* | 11D* |
|---|---|---|---|---|---|---|---|
| t-DMCD[B]:DMT[C] (molar ratio) | 1:3 | 1:3 | 1:3 | 0:1 | 0:1 | 0:1 | 0:1 |
| Mold Release/Stabilizer (%) | — | 0.1 | — | — | — | 0.25 | 0.35 |
| Melt viscosity @ 250° C. (poise) | 2000 | 2000 | 5600 | 5500 | 1900 | 1400 | 5700 |
| DSC Data | | | | | | | |
| Tm (°C.) | 199 | — | 200.7 | 222.2 | — | — | — |
| Hm (J/g) | 43 | — | 29.9 | 40.6 | — | — | — |
| Tc @ −60°/min (°C.) | 130 | — | 140.8 | 176.3 | — | — | — |
| Hc (J/g) | 38 | — | 33.6 | 35.1 | — | — | — |
| Tg (°C.) | — | — | — | 45 | — | — | — |
| Cp (J/g.K) | — | — | — | 0.08 | — | — | — |
| Tensile Strength (psi) | 5800 | — | — | 7230 | 7700 | 7100 | 7700 |
| Tensile Elongation (%) | 550 | — | — | 457 | 160 | 320 | 260 |
| Flexural Modulus (Kpsi) | 221 | — | — | 330.5 | 309 | 319 | 322 |
| Flexural Strength (psi) | 9800 | — | — | 12,700 | 13,400 | 14,200 | 13,400 |
| Notched Izod @ RT (ft-lbs/in) | 1.2 | 0.9 | — | 0.94 | 0.7 | 0.5 | 0.8 |
| Unnotched Izod @ RT (ft-lbs/in) | NB | NB | — | NB | NB | NB | NB |
| Falling Dart Impact @ Max. load | | | | | | | |
| (ft-lbs) | 23 | 16 | — | — | 20 | 19 | 12 |
| total (ft-lbs) | 37 | 35 | — | — | 36 | 31 | 50 |
| Spiral Flow (m) Channel Cross Section | | | | | | | |
| .094" × .313" | 350 | — | — | — | — | — | 230 |
| .048" × .313" | 94 | 91 | — | 68 | 86 | 90 | 61 |
| .032" × .313" | 39 | 41 | — | 21 | 35 | 36 | 19 |
| .016" × .313" | 5 | 5 | — | 4 | 5 | 5 | 4 |

[A]-Copolyesters of 1,4-butane diol, dimethyl-trans-1,4-cyclohexanedicarboxylate, and dimethyl terephthalate.
[B]-Dimethyl-trans-1,4-cyclohexanedicarboxylate.
[C]-Dimethyl terephthalate.

COMPARATIVE EXAMPLE 12*

A melt blend of 2.0 parts of poly(1,4-butylene terephthalate) (melt viscosity 7500 poise), 1.0 part of poly(1,4-butylene-trans-cyclohexanedicarboxylate) (PBCD) (melt viscosity 6000 poise) and 0.2 part of antioxidant was prepared, extruded, molded and tested as in Example 1.

The parts had a pearlescent appearance. The DSC curves indicated double melting and crystallization temperatures corresponding to separate melting and crystallization of the individual components.

Properties are summarized in Table 2.

COMPARATIVE EXAMPLE 13*

A melt blend of equal parts of poly(1,4-butylene terephthalate) (PBT) (melt viscosity approximately 8000 poise) (Valox ® 315 - General Electric Company - Pittsfield, MA) and poly(1,4-butylene-trans-1,4-cyclohexanedicarboxylate) (PBCD) (melt viscosity 2500 poise) was prepared and was extruded, molded and tested as in Example 1.

Two distinct DSC melting peaks at 161° C. and 226° C. respectively were found. Additionally, two distinct crystallization peaks at 170° C. and 132° C. were found.
Properties are summarized in Table 2.

COMPARATIVE EXAMPLE 14*

A melt blend of 1.0 part of poly(1,4-butylene terephthalate) (melt viscosity 7500 poise), 2.0 parts of poly(1,4-butylene-trans-1,4-cyclohexanedicarboxylate) (PBCD) (melt viscosity 6000 poise) and 0.2 parts of antioxidant was prepared, extruded, molded and tested as in Example 1.

The parts had a pearlescent appearance. The DSC curves indicated double melting and crystallization temperatures corresponding to separate melting and crystallization of the individual components.
Properties are summarized in Table 2.

COMPARATIVE EXAMPLE 15*

A melt blend of 3.0 parts of poly(1,4-butylene terephthalate) (PBT) (Valox® 315 - General Electric Company) and 1.0 part of poly(1,4-butylene-trans-1,4-cyclohexanedicarboxylate) (PBCD) (melt viscosity 1100 poise) was prepared. The melt blend was extruded, molded and tested as in Example 1.
Properties are summarized in Table 2.

Examples 1–4 when compared with Comparative Examples 12*–15* illustrate the improved ductility, as measured by Notched Izod, that copolyesters of the present invention exhibit over melt blends of homopolymer polyesters prepared from the same reactants.

The single melting and crystallization peaks observed in Examples 1–4 when compared with the two distinct melting peaks observed in Comparative Examples 12* and 15* and the two distinct crystallization peaks observed in Comparative Example 12* indicate the surprising co-crystallization of the butylene cyclohexanedicarboxylate and the butylene terephthalate segments of the copolyesters of the present invention.

TABLE 2

| | PBCD-PBT MELT BLENDS | | | |
|---|---|---|---|---|
| Example | 12* | 13* | 14* | 15* |
| PBCD$^A$:PBT$^B$ (weight ratio) | 1:2 | 1:1 | 2:1 | 1:3 |
| Antioxidant (%) | 0.2 | — | 0.2 | — |
| Melt Viscosity @ 250° C. (poise) | — | — | — | 5100 |
| DSC Data | | | | |
| Tm (°C.) | 162/227 | 161/226 | 163/229 | 163/225 |
| Hm (J/g) | 5.7/27.1 | — | 15.1/16.7 | — |
| Tc (°C.) | 187/135 | 170/132 | 185/135 | — |
| Hc (J/g) | 21.1/8.0 | — | 10.4/17.1 | — |
| Tensile Strength (psi) | — | — | — | 6300 |
| Tensile Elongation (%) | — | — | — | 150 |
| Flexural Modulus (Kpsi) | 257 | — | 133 | 298 |
| Flexural Strength (psi) | 10000 | — | 13300 | 11200 |
| Notched Izod @ RT (ft-lbs/in) | 0.9 | — | 1.0 | 0.86 |
| Unnotched Izod @ RT (ft-lbs/in) | — | — | — | NB |
| Falling Dart Impact | | | | |
| @ max. load (ft.-lbs.) | — | — | — | 18 |
| total load (ft.-lbs.) | — | — | — | 27 |

$^A$-poly(1,4-butylene-trans-1,4-cyclohexanedicarboxylate).
$^B$-poly(1,4-butylene terephthalate) - Valox ® 315 - General Electric Company - Pittsfield, MA.

EXAMPLE 16

A melt blend of 50.0 parts of a copolyester prepared by the procedure of Example 3 and 50.0 parts of poly(1,4-butylene terephthalate) (PBT) (Valox®315 - melt viscosity approximately 8000 poise - General Electric Company) having an overall t-DMCD:DMT ratio of 1:5 was extruded, molded and tested as in Example 1.

Transmission electron microscopy indicated the blend was homogeneous.
Properties are summarized in Table 3.

EXAMPLE 17

A melt blend of 50.0 parts of a copolyester prepared by the procedure of Example 3 and 50.0 parts of poly(1,4-butylene trans-1,4-cyclohexane dicarboxylate) (PBCD) (melt viscosity 3000 poise) having an overall t-DMCD:DMT ratio of 2:1 was extruded, molded and tested as in Example 1.

Transmission electron microscopy indicated that the blend was not homogeneous but formed continuous interpenetrating network domains.
Properties are summarized in Table 3.

EXAMPLE 18

A melt blend of 50.0 parts of a copolyester prepared by the procedure of Example 1 and 50.0 parts of poly(1,4-butylene terephthalate) (PBT) (Valox® 315 - melt viscosity approximately 8000 poise - General Electric Company) having an overall-t-DMCD:DMT ratio of 1:2 was extruded, molded and tested as in Example 1.

The blend had a pearlescent appearance, and the DSC curves showed separate melting points of the individual copolyester and polyester components.

Transmission electron microscopy indicated that the blend was not homogeneous but formed continuous interpenetrating network domains.
Properties are summarized in Table 3.

EXAMPLE 19

A melt blend of 50.0 parts of a copolyester prepared by the procedure of Example 1 and 50.0 parts of polybutylene cyclohexane dicarboxylate (PBCD) (melt viscosity 3000 poise) having an overall t-DMCD:DMT ratio of 5:1 was extruded, molded and tested as in Example 1.

Transmission electron microscopy indicated that the blend was homogeneous.
Properties are summarized in Table 3.

EXAMPLE 20

A melt blend of 60.0 parts of a copolyester having a melt viscosity of 2200 poise at 250° C. prepared by the transesterification of trans-1,4-dimethylcyclohexane dicarboxylate (t-DMCD) and dimethyl terephthalate (DMT) in a molar ratio of 1:2, an excess of 1,4-butane diol (BD), and about 160 ppm of titanium in the form of tetrakis(2-ethyl hexyl) titanate and 40.0 parts of poly(1,4-butylene terephthalate) (PBT - Valox® 325 - General Electric Company) having an overall t-

DMCD:DMT ratio of 1:4 was extruded, molded and tested as in Example 1.

The blend is homogeneous.

Properties are illustrated in Table 3.

EXAMPLE 21

A melt blend of 75.0 parts of the copolyester of Example 20 and 25.0 parts of poly(1,4-butylene terephthalate) (PBT - Valox ® 325 - melt viscosity approximately 5800 poise General Electric Company) having an overall t-DMCD:DMT ratio of 1:3 was extruded, molded and tested as in Example 1.

The blend is homogeneous.

Properties are summarized in Table 3.

EXAMPLE 22

A melt blend of 80.0 parts of a copolyester having a melt viscosity of 2400 poise was prepared by the transesterification of trans-1,4-dimethylcyclohexane dicarboxylate (t-DMCD) and dimethylterephthalate (DMT) in a molar ratio of 3, an excess of 1,4-butane diol (BD), and about 160 ppm of titanium in the form of tetrakis(2-ethyl hexyl titanate), and 20.0 parts of poly(1,4-butylene terephthalate) (PBT - Valox ® 325 - General Electric Company) having an overall t-DMCD:DMT ratio of 1:4 was extruded, molded and tested as in Example 1.

Properties are summarized in Table 3.

EXAMPLE 23

A blend of 50.0 parts of the copolyester of Example 3 and 50.0 parts of polycarbonate resin (poly(bisphenol-A) carbonate - Lexan ® 120 - General Electric Co.) was extruded, blended and tested as in Example 1.

The blend was observed to be homogeneous and transparent. On heating at 20° C. per minute in the DSC, the blend crystallized at 133° C. with an enthalpy of crystallization of 14.2 J/g.

Properties are summarized in Table 4.

TABLE 4

| COPOLYESTER/PC BLENDS | |
|---|---|
| Example | 23 |
| Copolyester[A] (t-DMCD:DMT-1:2) | 50 |
| Polycarbonate[B] | 50 |
| DSC: | |
| Tm (°C.) | 185 |
| Hm (J/g) | 14.1 |
| Tch (°C.)[C] | 133 |
| Hch (J/g)[D] | 14.2 |
| Tensile Strength (psi) | 8900 |
| Tensile Elongation | 200 |
| Flexural Modulus (Kpsi) | 348 |
| Flexural Strength (psi) | 13100 |
| Notched Izod @ RT (ft.-lbs./in.) | 0.8 |
| Unnotched Izod @ RT | 18 |

TABLE 3

| PBCD COPOLYESTER/PBT OR PBCD MELT BLENDS | | | | | | | |
|---|---|---|---|---|---|---|---|
| Example | 16 | 17 | 18 | 19 | 20 | 21 | 22 |
| Copolyester[A] (t-DMCD:DMT-1:3) | — | — | — | — | — | — | 80 |
| Copolyester[B] (t-DMCD:DMT-1:2) | 50 | 50 | — | — | — | — | — |
| Copolyester[C] (t-DMCD:DMT-1:2) | — | — | — | — | 60 | 75 | — |
| Copolyester[D] (t-DMCD:DMT-2:1) | — | — | 50 | 50 | — | — | — |
| PBT[E] | 50 | — | 50 | — | — | — | — |
| PBT[F] | — | — | — | — | 40 | 25 | 20 |
| PBCD[G] | — | 50 | — | 50 | — | — | — |
| Overall t-DMCD:DMT | 1:5 | 2:1 | 1:2 | 5:1 | 1:4 | 1:3 | 1:4 |
| Melt Viscosity (poise) | — | — | — | — | 2800 | 2450 | 2600 |
| DSC: | | | | | | | |
| Tm (°C.) (Copolyester/polyester) | —/222 | 165/190 | 163/224 | 164/— | — | — | — |
| Hm (J/g) (Copolyester/polyester) | —/26.7 | 14.9/15.6 | 8.8/23.0 | 22.7/— | — | — | — |
| Tensile strength (psi) | 8500 | 5400 | 8500 | 4800 | 6500 | 6400 | 6600 |
| Tensile Elongation (%) | 460 | 370 | 530 | 400 | 200 | 310 | 270 |
| Flexural Modulus (Kpsi) | 294 | 123 | 206 | 133 | 284 | 270 | 289 |
| Flexural Strength (psi) | 10400 | 5100 | 8600 | 5200 | 12100 | 11500 | 12300 |
| Notched Izod @ RT (ft.-lbs./in.) | 1.3 | 1.2 | 1.0 | 1.5 | 0.9 | 1.0 | 1.0 |
| Unnotched Izod @ RT (ft.-lbs./in.) | NB | NB | NB | NB | 19.2 | 18.5 | 18.3 |
| Falling Dart Impact (ft.-lbs.) | | | | | | | |
| @ max. load | — | — | — | — | 15 | 15 | 15 |
| total load | — | — | — | — | 31 | 32 | 31 |
| Spiral Melt Flow (mm) Channel Cross Section | | | | | | | |
| 0.048 × 0.031" | — | — | — | — | 84 | 83 | 87 |
| 0.032 × 0.031" | — | — | — | — | 25 | 25 | 28 |
| 0.016 × 0.031" | — | — | — | — | 4 | 4 | 4 |

[A]-melt viscosity 2400 p at 250° C.
[B]-melt viscosity 4700 p at 250° C.
[C]-melt viscosity 2200 p at 250° C.
[D]-melt viscosity 4600 p at 250° C.
[E]-poly(1,4-butylene terephthalate) - melt viscosity 8000 p at 250° C. - Valox ® 315 - General Electric Co. - Pittsfield, MA.
[F]-poly(1,4-butylene terephthalate) - melt viscosity 5800 p at 250° C. - Valox ® 325 - General Electric Co. - Pittsfield, MA.
[G]-poly(butylene cyclohexanedicarboxylate) melt viscosity 3000 p at 250° C.

TABLE 4-continued
COPOLYESTER/PC BLENDS

| Example | 23 |
|---|---|
| (ft.-lbs./in.) | |

[A] melt viscosity - 4700 poise at 250° C. - Example 3.
[B] poly(bisphenol-A) carbonate - Lexan ® 120 - General Electric Co. - Pittsfield, MA.
[C] peak temperature of crystallization on heating at 20° C./min.
[D] enthalpy of crystallization on heating at 20° C./min.

EXAMPLE 24

A blend of 65.0 parts of the copolyester of Example 20, 15.0 parts of poly(butylene cyclohexane dicarboxylate) having a melt viscosity of approximately 5000 poise at 250° C., 15.0 parts of a core-shell multi-stage polymer having a core of polymerized butadiene and styrene, methylmethacrylate and divinylbenzene, a second stage/shell of polymerized styrene and an outer shell of polymerized methylmethacrylate and 1,3-butylene glycol methacrylate (ACRYLOID ® KM 330, also known as PARALOID ® EXL 3330 - Rohm & Hass Co. - Philadelphia, Pa.) and 1.0 part of a stabilizer package was extruded, molded and tested as in Example 1.

The blended product was observed to be flexible and elastomeric.

Properties are summarized in Table 5.

TABLE 5
IMPACT MODIFIED COPOLYESTER BLEND

| Example | 24 |
|---|---|
| Copolyester[A] | 69.0 |
| PBCD[B] | 15.0 |
| Modifier[C] | 15.0 |
| Stabilizers | 1.0 |
| Overall T-DMCD:DMT | 9:11 |
| Tensile Strength (psi) | 3800 |
| Tensile Elongation (%) | 325 |
| Flexural Modulus (Kpsi) | 109 |
| Flexural Strength (psi) | 6500 |
| Notched Izod (fpi) | |
| @ 25° C. | 9.2 |
| −40° C. | 2.6 |
| Unnotched Izod (fpi) | 13.4 |
| @ 25° C. | |
| Falling Dart Impact | |
| @ max. load (ft.-lbs.) | 12.7 |
| total (ft.-lbs.) | 23.2 |

[A] DMCD/DMT ratio is 1:2 - melt viscosity 2200 poise at 250° C.
[B] melt viscosity 5000 poise at 250° C.
[C] core-shell multi-stage polymer - core = polymerized butadiene and styrene, methylmethacrylate and divinyl benzene - second stage/shell = polymerized styrene - outer shell = polymerized methylmethacrylate and 1,3-butylene glycol dimethacrylate - (ACRYLOID ® KM 653, also known as PARALOID ® EXL 3691 Rohm & Haas Co. - Philadelphia, PA).

EXAMPLE 25

A random copolymer was prepared by reacting 7.4 parts of 1,4-cyclohexanedimethanol (25:75 cis to trans ratio) with 5.0 parts each of dimethyl terephthalate and 5.0 parts of dimethyl-trans-1,4-cyclohexanedicarboxylate in the presence of a small amount of titanium ester catalyst.

The product was amorphous, but crystallized on heating in the Differential Scanning Calorimeter with a peak crystallization temperature of 151° C. and an enthalpy of crystallization of 16.9 J/g. On further heating, the product showed a single metling point at 222° C. with an enthalpy of fusion of 20.5 J/g. The material did not crystallize significantly when cooled in the DSC apparatus at a rate of 60° C./min, in contrast to the random PBCD/T copolymers of the present invention.

EXAMPLE 26

A copolyester was prepared from 5.0 parts of DMT and 5.0 parts of dimethyl-trans-1,4-cyclohexane dicarboxylate with 7.4 parts of cyclohexanedimethanol with 25:75 cis- to trans-enantiomer ratio and a small amount of tetrakis(2-ethyl hexyl)titanate catalyst using the procedure described above.

The product had a single melting point at 222° C. with an enthalpy of fusion of 20.5 J/g. On heating, the material crystallized at 150.8° C. with an enthalpy of crystallization of 16.9 J/g.

All patents, applications, publications and test methods mentioned above are hereby incorporated by reference.

Many variations of the present invention will suggest themselves to those skilled in this art in light of the above, detailed description. All such obvious variations are within the full intended scope of the appended claims.

I claim:

1. A thermoplastic copolyester composition having improved ductility, mold flow, and rate of crystallization, and a melting point of about 161° C. or higher, comprising the reaction product of (A) at least one alkane diol selected from the group consisting of straight chain, branched, and cycloaliphatic $C_2$-$C_{10}$ alkane diols; (B) a mixture of at least two cycloaliphatic diacids; said mixture comprising from about 0.5 to about 49 parts by weight of a cis-enantiomer and from about 51 to about 99.5 parts by weight of a trans-enantiomer, the parts by weight of the cis-enantiomer and the trans-enantiomer being based upon 100 parts by weight of the cis- and trans-enantiomers combined; and (C) at least one aromatic diacid; wherein the molar ratio of cycloaliphatic diacid to aromatic diacid thereof ranges from 1:9 to 1:1, wherein said copolyester has recurring units of the formula

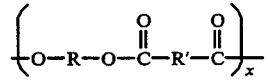

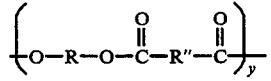

wherein R represents residue of the alkane diol, R' represents the decarboxylated residue derived from the cycloaliphatic diacids, and R" represents an aromatic radical which is the decarboxylated residue of the aromatic diacid, and wherein the x units comprise from 10 to 90 parts by weight and the y units comprise from 90 to 10 parts by weight of 100 parts by weight of the copolyester.

2. A composition as defined in claim 1 wherein said alkane diol (A) is selected from the group consisting of ethylene glycol, propylene glycol, butylene glycol and cyclohexane dimethanol.

3. A composition as defined in claim 2 wherein said alkane diol (A) comprises 1,4-butane diol.

4. A composition as defined in claim 4 wherein said mixture of cycloaliphatic diacids (B) comprises a mixture of cis- and trans-1,4-cyclohexane dicarboxylic acid.

5. A composition as defined in claim 1 wherein said mixture of cis- and trans-1,4-cyclohexane dicarboxylic acid comprises at least about 75 parts by weight of the trans-enantiomer and the remainder comprises the cis-enantiomer based upon 100 parts by weight of cis- and trans-enantiomers combined.

6. A composition as defined in claim 1 wherein said aromatic diacid (C) is selected from the group consisting of isophthalic acid, terephthalic acid, and a mixture thereof.

7. A composition as defined in claim 6 wherein said aromatic diacid (C) comprises terephthalic acid.

8. A composition as defined in claim 1 wherein the molar ratio of cycloaliphatic diacid to aromatic diacid provides an impact strength of said copolyester which is independently increased over the impact strength of the homopolymer of said cycloaliphatic diacid and said diol and of the homopolymer of said aromatic diacid and said diol.

9. The copolyester composition of claim 1, wherein said molar ratio of cycloaliphatic diacid thereof to aromatic diacid or chemical equivalent thereof ranges from 1:9 to 1:5.

* * * * *